United States Patent
Scoville et al.

(10) Patent No.: US 10,988,345 B2
(45) Date of Patent: Apr. 27, 2021

(54) DIRECT REAL-TIME TRAVEL INDICATIONS FOR MULTI-SEGMENT TRIP

(71) Applicant: Otis Elevator Company, Farmington, CT (US)

(72) Inventors: Bradley Armand Scoville, Farmington, CT (US); Harrison Daniels, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 500 days.

(21) Appl. No.: 15/926,544

(22) Filed: Mar. 20, 2018

(65) Prior Publication Data

US 2019/0292012 A1    Sep. 26, 2019

(51) Int. Cl.
*B66B 3/00* (2006.01)
*H04W 4/024* (2018.01)
(Continued)

(52) U.S. Cl.
CPC .......... *B66B 3/006* (2013.01); *B66B 1/2408* (2013.01); *H04L 67/04* (2013.01); *H04L 67/12* (2013.01);
(Continued)

(58) Field of Classification Search
CPC ................ B66B 3/006; B66B 1/2408; B66B 2201/4653; B66B 2201/103; B66B 1/00; B66B 1/3461; B66B 2201/4638; H04L 67/04; H04L 67/12; H04W 4/024; H04W 4/33
See application file for complete search history.

(56) References Cited

U.S. PATENT DOCUMENTS 8,348,021 B2    1/2013  Finschi
9,469,502 B2 *  10/2016 Parkkinen ............... B66B 3/006
(Continued)

FOREIGN PATENT DOCUMENTS

CN    101378982 A    3/2009
CN    105516450 A    4/2016
(Continued)

OTHER PUBLICATIONS

European Search Report Issued in European Application No. 19162865.0 dated Jul. 30, 2019; 8 Pages.

*Primary Examiner* — Jeffrey Donels
(74) *Attorney, Agent, or Firm* — Cantor Colburn LLP

(57) ABSTRACT

A computer-implemented method is provided. The computer-implemented method is executed by a processor of a mobile device. The mobile device is in communication with an elevator system. The computer-implemented method automatically provides direct real-time travel indications with respect to an elevator trip of the elevator system. The computer-implemented method includes receiving, by the mobile device, a request for the elevator trip. The computer-implemented method includes directly receiving, by the mobile device, feedback signals from the elevator system with respect the elevator trip in response to the request. The computer-implemented method includes automatically providing, by a user interface of the mobile device, direct real-time travel indications of the elevator trip as the mobile device progresses through the elevator system.

20 Claims, 4 Drawing Sheets

(51) Int. Cl.
  *H04W 4/33* (2018.01)
  *B66B 1/24* (2006.01)
  *H04L 29/08* (2006.01)

(52) U.S. Cl.
  CPC ............ *H04W 4/024* (2018.02); *H04W 4/33* (2018.02); *B66B 2201/103* (2013.01); *B66B 2201/4653* (2013.01)

(56) References Cited

U.S. PATENT DOCUMENTS

| | | | |
|---|---|---|---|
| 9,580,272 B2 | 2/2017 | Kappeler et al. | |
| 10,273,117 B2* | 4/2019 | Buckman | B66B 1/468 |
| 10,450,163 B2* | 10/2019 | Sha | B66B 3/00 |
| 10,597,255 B2* | 3/2020 | Chapman | B66B 1/3461 |
| 10,640,329 B2* | 5/2020 | Simcik | H04W 4/023 |
| 10,645,543 B2* | 5/2020 | Chen | B66B 1/3461 |
| 10,647,545 B2* | 5/2020 | Scoville | B66B 1/468 |
| 2004/0088107 A1* | 5/2004 | Seligmann | G01C 21/36 |
| | | | 709/224 |
| 2012/0138388 A1* | 6/2012 | Finschi | B66B 1/2458 |
| | | | 187/247 |
| 2015/0034426 A1* | 2/2015 | Armistead | B66B 5/0037 |
| | | | 187/392 |
| 2016/0207735 A1* | 7/2016 | Elomaa | B66B 13/146 |
| 2016/0221791 A1 | 8/2016 | Berryhill | |
| 2016/0325962 A1* | 11/2016 | Blandin | B66B 1/468 |
| 2016/0376124 A1 | 12/2016 | Bunter et al. | |
| 2017/0122744 A1 | 5/2017 | Long et al. | |
| 2017/0284813 A1 | 10/2017 | Zhang | |
| 2018/0099840 A1* | 4/2018 | Armistead | B66B 3/008 |
| 2019/0161316 A1* | 5/2019 | Nichols | B66B 1/2408 |
| 2019/0161317 A1* | 5/2019 | Nichols | B66B 1/2408 |

FOREIGN PATENT DOCUMENTS

| | | |
|---|---|---|
| EP | 3141509 A1 | 3/2017 |
| EP | 3210921 A1 | 8/2017 |
| JP | 2001302127 A | 10/2001 |
| WO | 2011102654 A2 | 8/2011 |
| WO | 2017024102 A1 | 2/2017 |
| WO | 2017144384 A1 | 8/2017 |
| WO | 2017175021 A1 | 10/2017 |

* cited by examiner

DIRECT REAL-TIME TRAVEL INDICATIONS FOR MULTI-SEGMENT TRIP

BACKGROUND

In present high rise buildings, conventional elevator systems require passengers to take multi-segment trips (e.g., ride multiple elevators) to get to their destination. In turn, the conventional elevator systems of the high rise buildings require the passengers to learn a layout of the high rise buildings (e.g., which elevators serve which floors) to initiate and accomplish these multi-segment trips. Multi-segment trips may be challenging and add a level of complication to elevator travel, especially to visitors who are new to a particular high rise building.

BRIEF DESCRIPTION

In accordance with one or more embodiments, a computer-implemented method is provided. The computer-implemented method is executed by a processor of a mobile device. The mobile device is in communication with an elevator system. The computer-implemented method automatically provides direct real-time travel indications with respect to an elevator trip of the elevator system. The computer-implemented method includes receiving, by the mobile device, a request for the elevator trip; directly receiving, by the mobile device, feedback signals from the elevator system with respect the elevator trip in response to the request; and automatically providing, by a user interface of the mobile device, direct real-time travel indications of the elevator trip as the mobile device progresses through the elevator system.

In accordance with one or more embodiments or the computer-implemented method embodiment above, the request is provided to the elevator system by the mobile device to cause the elevator system to determine one or more segments of the elevator trip and reply with each corresponding one of the feedback signals as the mobile device progresses through the elevator system.

In accordance with one or more embodiments or any of the computer-implemented method embodiments above, the request can be utilized by the mobile device to determine the elevator trip.

In accordance with one or more embodiments or any of the computer-implemented method embodiments above, the request can be a user input provided through the user interface of the mobile device.

In accordance with one or more embodiments or any of the computer-implemented method embodiments above, the request can be an automatic elevator call based on a calendar invite, a mobile device location, or a local time.

In accordance with one or more embodiments or any of the computer-implemented method embodiments above, each of the feedback signals can correspond to a completion of a segment of the elevator trip.

In accordance with one or more embodiments or any of the computer-implemented method embodiments above, each of the feedback signals can be provided by the elevator system to the mobile device upon detection of the mobile device at a corresponding checkpoint.

In accordance with one or more embodiments or any of the mobile device embodiments above, the direct real-time travel indications of the elevator trip can include graphic representations of the one or more segments of the elevator trip, each of the graphic representations can presents an elevator assignment as the elevator assignment becomes available to the mobile device.

In accordance with one or more embodiments or any of the computer-implemented method embodiments above, the direct real-time travel indications of the elevator trip can include graphic representations of the one or more segments of the elevator trip, the graphic representations can be proportionally sized with respect to each other based on a length of travel time for a corresponding segment of the elevator trip.

In accordance with one or more embodiments or any of the computer-implemented method embodiments above, the direct real-time travel indications of the elevator trip can include audio or vibration alerts that signal a completion of a segment of the elevator trip.

In accordance with one or more embodiments, a mobile device is provided. The mobile device includes a memory and a processor. The mobile device is in communication with an elevator system. The memory stores program instructions for automatically providing direct real-time travel indications with respect to an elevator trip of an elevator system. The program instructions are executable by the processor to cause receiving, by the mobile device, a request for the elevator trip; directly receiving, by the mobile device, feedback signals from the elevator system with respect the elevator trip in response to the request; and automatically providing, by a user interface of the mobile device, direct real-time travel indications of the elevator trip as the mobile device progresses through the elevator system.

In accordance with one or more embodiments or the mobile device embodiment above, the request is provided to the elevator system by the mobile device to cause the elevator system to determine one or more segments of the elevator trip and reply with each corresponding one of the feedback signals as the mobile device progresses through the elevator system.

In accordance with one or more embodiments or any of the mobile device embodiments above, the request can be utilized by the mobile device to determine the elevator trip.

In accordance with one or more embodiments or any of the mobile device embodiments above, the request can be a user input provided through the user interface of the mobile device.

In accordance with one or more embodiments or any of the mobile device embodiments above, the request can be an automatic elevator call based on a calendar invite, a mobile device location, or a local time.

In accordance with one or more embodiments or any of the mobile device embodiments above, each of the feedback signals can correspond to a completion of a segment of the elevator trip.

In accordance with one or more embodiments or any of the mobile device embodiments above, each of the feedback signals can be provided by the elevator system to the mobile device upon detection of the mobile device at a corresponding checkpoint.

In accordance with one or more embodiments or any of the mobile device embodiments above, the direct real-time travel indications of the elevator trip can include graphic representations of the one or more segments of the elevator trip, each of the graphic representations can presents an elevator assignment as the elevator assignment becomes available to the mobile device.

In accordance with one or more embodiments or any of the mobile device embodiments above, the direct real-time travel indications of the elevator trip can include graphic representations of the one or more segments of the elevator trip, the graphic representations can be proportionally sized with respect to each other based on a length of travel time for a corresponding segment of the elevator trip.

In accordance with one or more embodiments or any of the mobile device embodiments above, the direct real-time travel indications of the elevator trip can include audio or vibration alerts that signal a completion of a segment of the elevator trip.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In accordance with one or more embodiments, a hands-free mechanism provides passengers an ability to get from any source floor to any destination floor based on a single request. For instance, the hands-free mechanism determines (or causes the determination thereof) a number of required segments for an elevator trip (i.e., single-segment elevator trip or multi-segment elevator trip) based on the single request from a mobile device. The hands-free mechanism, then, provides guidance to a passenger possessing the mobile device as the elevator trip progresses.

Further, in accordance with one or more embodiments, upon completing a segment of a multi-segment elevator trip, the mobile device can provide a confirmation that the segment is complete and trigger a next segment request. The hands-free mechanism, next, provides a notification of a next elevator assignment.

Also, a next segment request may be event driven based on the mobile device arriving at one or more checkpoints, e.g., boarding an assigned elevator, arriving at a segment destination, arriving in a segment lobby, etc. The next segment request can also be based on elevator system data, such as an elevator position.

The technical effects and benefits of the hands-free mechanism described herein include automatically providing direct real-time travel indications (guidance/notifications) through a hands-free user interface with respect to an elevator trip within an elevator system. Further, the hands-free user interface can provide hands-free user interface for navigation in a high rise building with respect to any elevator trip, including multi-segment trips.

Figure 1:
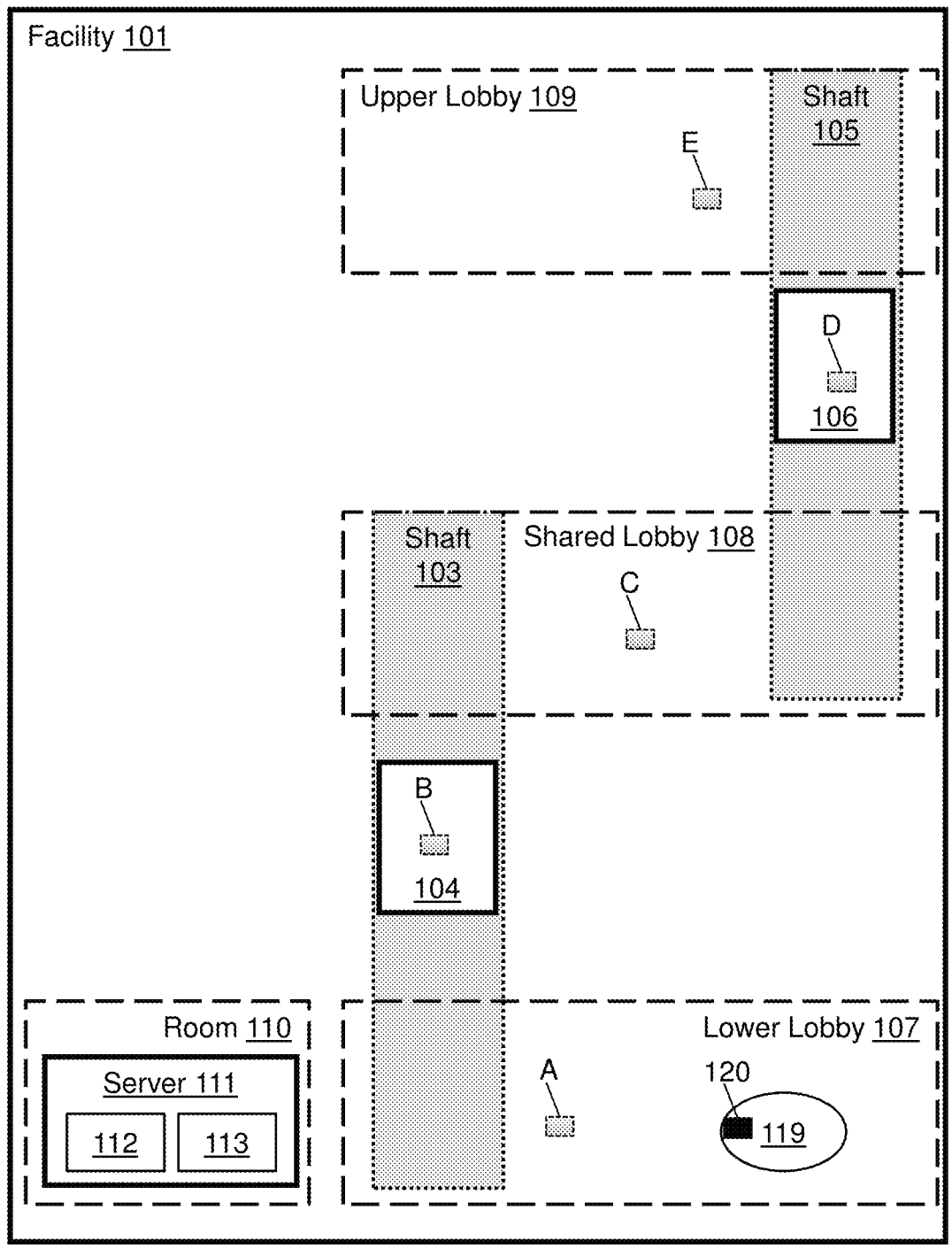
FIG. 1 depicts an environment for automatically providing direct real-time travel indications with respect to an elevator trip within an elevator system according to one or more embodiments.

FIG. 1 depicts an environment for a hands-free mechanism that provides passengers an ability to get from any source floor to any destination floor based on a single request and automatically provides direct real-time travel indications with respect to an elevator trip within the elevator system, according to one or more embodiments. The environment can include a facility 101 (e.g., a high rise building) comprising at least one elevator shaft supporting at least one elevator car.

As shown in FIG. 1, the facility 101 includes an elevator shaft 103 supporting an elevator car 104 and an elevator shaft 105 supporting an elevator car 106. Note that the elevator car 104 can be accessed at least at a lower lobby 107 (e.g., a ground floor of the facility 101) and a shared lobby 108 (e.g., a middle floor of the facility 101). Further, note that the elevator car 106 can be accessed at least at the shared lobby 108 and an upper lobby 109 (e.g., a top floor of the facility 101). In this regard, the shaft 103 only permits the elevator car 104 to travel between a lower floor and a middle floor and/or stop at any floors in that range (which can be considered an individual segment), and the shaft 105 only permits the elevator car 106 to travel between the middle floor and a top floor and/or stop at any floors in that range (which can also be considered an individual segment). The arrangement of elevator shafts 103 and 105 is for exemplary purposes only and any desired arrangement and number of elevator shafts and elevator cars may be used.

The environment of FIG. 1 comprises a room 110 with a computer 111 therein. The computer 111 comprises a processor 112 and a memory 113. The memory 113 stores program instructions that are executable by the processor 112 to cause the operation described herein. The computer 111 can support and/or be a part of an elevator system that operates the elevator cars 104 and 105.

The elevator system interacts with a mobile device of a passenger 119 (e.g., the mobile device 120) to provide a hands-free user interface for generating elevator calls and providing guidance to the passenger 119 possessing the mobile device 120 as the elevator trip progresses. For instance, the mobile device 119 and the elevator system can communicate and provide guidance as the passenger 119 progresses between one or more checkpoints A, B, C, D, and E designated throughout the environment of FIG. 1. Further, the environment of FIG. 1 and the elevator system can include configurations for a mobile device centric system (e.g., when the mobile device 120 self-detects its location and provides direct guidance), a location device centric system (e.g., when the elevator system detects the mobile device 120 and causes the mobile device 119 to provide guidance), or a combination thereof.

In accordance with one or more embodiments, the elevator system comprises one or more location devices (electro-mechanical components) within location zones that detect the mobile device 119 at the one or more checkpoints A, B, C, D, and E. The location devices can include transceivers (e.g., communications and/or interface adapter) that can communicate with the computer 111 and/or the mobile device 120. Examples of the location devices include radio devices, such as Wi-Fi devices, Bluetooth devices, wireless beacon devices, etc. For example, each location device can be located within and correspond thereto the lower lobby 107 (e.g., checkpoint A), the shared lobby 108 (e.g., checkpoint C), the upper lobby 109 (e.g., checkpoint E), the elevator car 104 (e.g., checkpoint B), and the elevator car 106 (e.g., checkpoint D). Each radius of each location zone can be predetermined and configured within the elevator system, such as at a distance of a width of a lobby or an elevator car. Moreover, any location zone and location device may be placed as desired within the environment of FIG. 1 and the elevator system, such as in an elevator fixture. In one embodiment, the location zone may be rectangular, planar, 3-dimensional, or any other desired shape and/or size.

The environment of FIG. 1 and the elevator system described herein is an example and is not intended to suggest any limitation as to the scope of use or operability of embodiments described herein (indeed additional or alternative components and/or implementations may be used). Further, while single items are illustrated for items of the environment of FIG. 1, these representations are not intended to be limiting and thus, any item may represent a plurality of items.

The computer 111 can include any processing hardware, software, or combination of hardware and software utilized by the elevator system to carry out computer readable program instructions by performing arithmetical, logical, and/or input/output operations. The computer 111 can be implemented local to the facility 101, remote to the facility 101, or as a cloud service. As shown, the computer 111 is located in the room 102 (e.g., a server room). The computer 111 can be representative of a plurality of computers dispersed throughout the environment of FIG. 1 and the elevator system, or elsewhere.

The processor 112 can comprise one or more central processing units (CPU(s)), also referred to as processing circuits, coupled via a system bus to the memory 113 and various other internal or external components (e.g., the location devices). The memory 113 can include a read only memory (ROM) and a random access memory (RAM).

The computer 111, by utilizing the processor 112 and the memory 113, operates to provide/support automatic calls of the elevator system for navigation in the facility 101 with respect to any elevator trip. The computer 111, by utilizing the processor 112 and the memory 113, operates to support the hands-free user interface of the mobile device 120, such as guidance for navigation in the facility 101 with respect to any elevator trip. The computer 111, by utilizing the processor 112 and the memory 113, can operate to communicate with the location devices and/or the mobile device 120. The computer 111 can also determine a status of each elevator car 104 and 106, such as which floor an elevator car is located, which direction an elevator car is traveling, a number of stops designated for an elevator trip, an elevator door position, an elevator door operation (opening vs. closing), etc. The computer 111 can operate one or more timers (e.g., movement timers and disconnect timers) with respect to the operations described herein.

The mobile device 120 can include any processing hardware, software, or combination of hardware and software utilized to carry out computer readable program instructions by performing arithmetical, logical, and/or input/output operations. The mobile device 120 can include any wireless device operated by a passenger, such as a laptop, a table computer, a mobile phone, a smartphone, a wireless beacon on the user (e.g., an electronic bracelet), radio frequency identification card, smartwatches, implants, smart glasses, wearable components, and the like. The mobile device 120 can interact/detect/communicate with the one or more location devices of the elevator system, can support/provide/execute an application and a hands-free user interface, and can connect to the computer 111 (wirelessly through an internet, cellular, or cloud connection).

Figure 2:
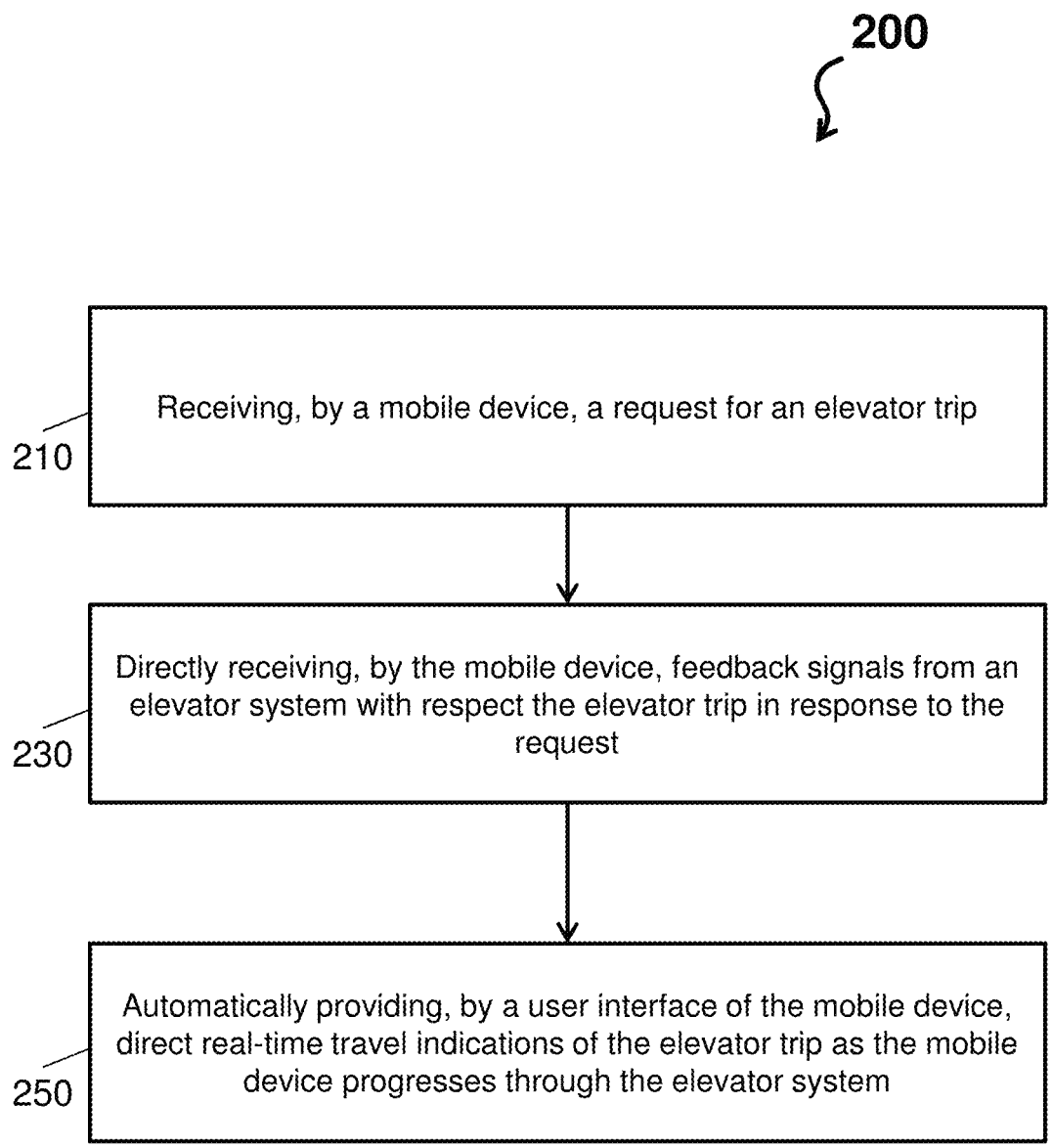
FIG. 2 depicts a process flow of an elevator system according to one or more embodiments.

Turning now to FIG. 2, a process flow 200 of the elevator system is depicted according to one or more embodiments. The process flow 200 is an example operation to automatically providing direct real-time travel indications with respect to an elevator trip within the elevator system. For ease of explanation, the process flow 200 is now described with respect to a mobile device centric system (e.g., when the mobile device 120 self-detects its location and provides direct guidance).

The process flow 200 begins, at block 210, with the mobile device 120 receiving a request for the elevator trip. The request can be a user input provided through the user interface of the mobile device 120. The request can also be an automatic elevator call based on a calendar invite, a mobile device location, or a local time (each of which is stored on the mobile device 120).

In accordance with one or more embodiments, the request is provided to the elevator system by the mobile device 120. In turn, upon receipt of the request, the elevator system determines one or more segments of the elevator trip. Once determined, the elevator system can reply with each corresponding one of the feedback signals as the mobile device progresses through the elevator system. In another embodiment, the mobile device 120 itself determines the elevator trip.

At block 230, the mobile device directly receives feedback signals from the elevator system with respect the elevator trip in response to the request. In accordance with one or more embodiments, each of the feedback signals can correspond to a completion of a segment of the elevator trip and/or can be provided by the elevator system to the mobile device upon detection of the mobile device at a corresponding checkpoint.

At block 230, a user interface of the mobile device automatically provides direct real-time travel indications of the elevator trip as the mobile device progresses through the elevator system. In accordance with one or more embodiments, the direct real-time travel indications of the elevator trip include graphic representations. Each of the graphic representations can correspond to one of the segments of the elevator trip. Further, each of the graphic representations can present an elevator assignment as the elevator assignment becomes available to the mobile device 120. In an embodiment, the graphic representations are proportionally sized with respect to each other based on a length of travel time for a corresponding segment of the elevator trip (e.g., if a first segment takes twice the amount of time as a second segment, then the graphic representation of the first segment can have twice the length as the second segment). In accordance with one or more embodiments, for those with visual impairments, the direct real-time travel indications of the elevator trip comprise audio or vibration alerts that signal a completion of a segment of the elevator trip.

Figure 3:
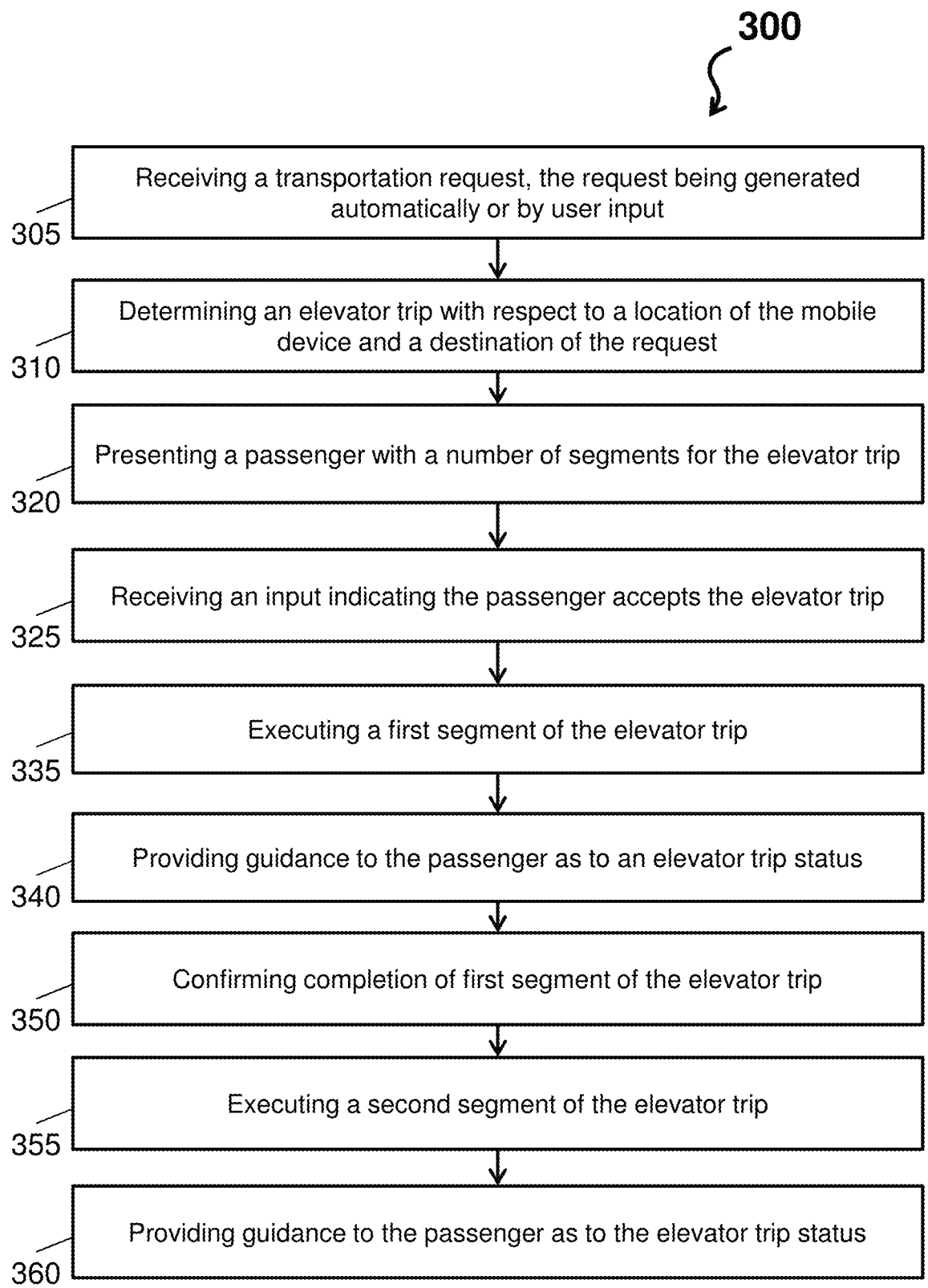
FIG. 3 depicts a process flow of an elevator system according to one or more embodiments.
Figure 4:
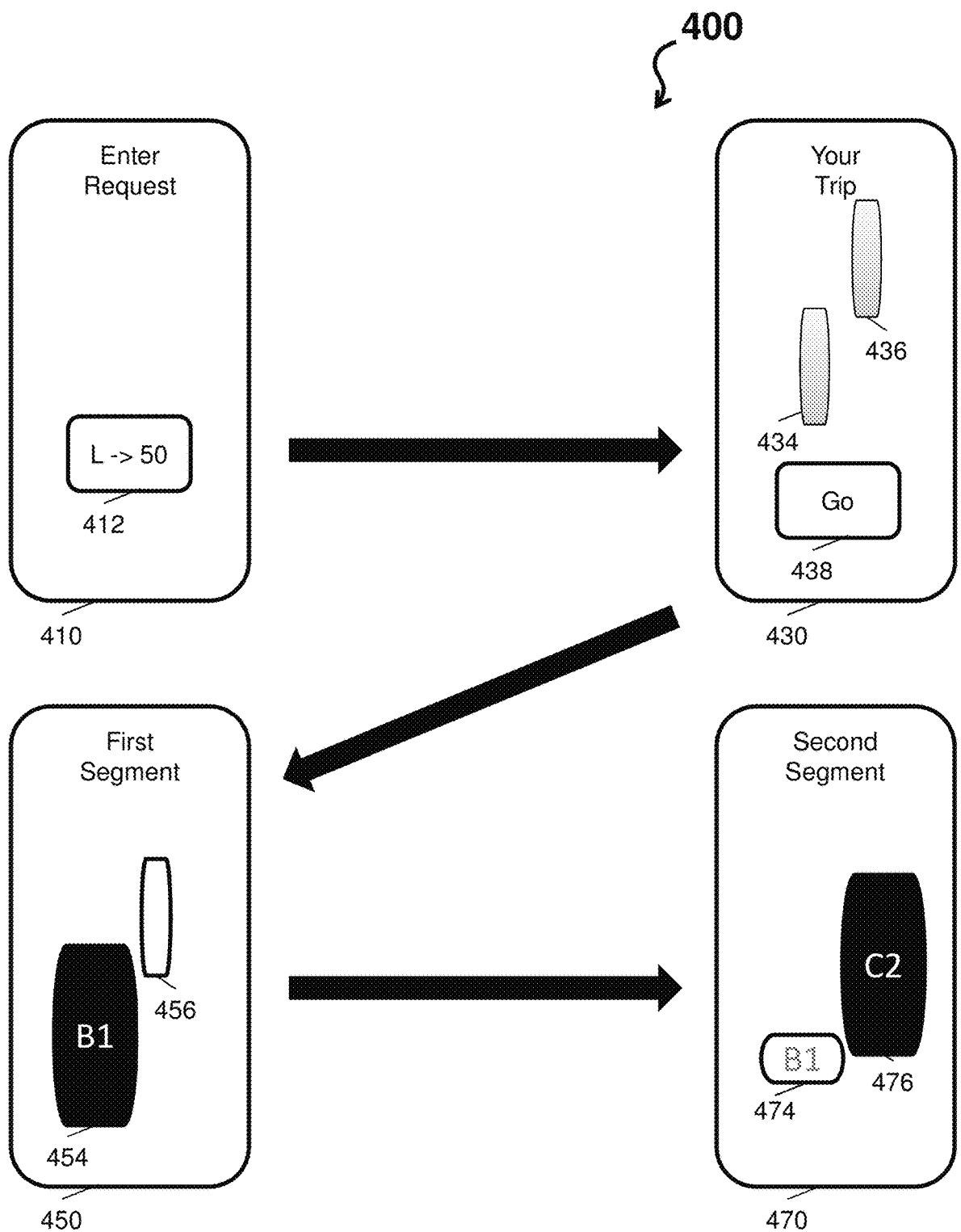
FIG. 4 depicts a process flow of a user interface of a mobile device according to one or more embodiments.

Turning now to FIGS. 3-4, an example mobile device centric system operation is described. FIG. 3 depicts a process flow 300 of the elevator system is depicted according to one or more embodiments. FIG. 4 depicts a process flow 400 of user interface of a mobile device according to one or more embodiments. As shown in FIG. 4, the user interface can progress through one or more stages as the status of the multi-segment trip changes.

The example mobile device centric system operation illustrates a user interface provides a hands-free solution for providing a status of a multi-segment trip (e.g., direct real-time travel indications of an elevator trip). The user interface is supported by software of the mobile device 120.

The process flow 300 begins, at block 305, where the mobile device 120 receives a transportation request. The transportation request can generated automatically (e.g., a calendar invite or meeting can cause an elevator call five minutes before the meeting; a mobile device location at the lower lobby 107 can trigger an immediate elevator call; and an automatic elevator call can be issued when a local time indicates a workday has concluded). The transportation request can be a user input. Turning to FIG. 4, at a first stage 410, the user interface includes a field 412 for entering a floor, e.g., L→50.

At block 310, the mobile device 120 determines an elevator trip with respect to a location of the mobile device 120 and a destination of the request (e.g., the 50th floor).

At block 320, the mobile device 120 presents a passenger with a number of segments for the elevator trip. Turning to FIG. 4, at a second stage 430, the user interface presents a first segment 434, a second segment 436, and a 'Go' button 438. Note how the first segment 434 and the second segment 436 are proportionally the same size to indicate that each segment is equal in travel time.

At block 325, the mobile device 120 receives an input indicating the passenger accepts the elevator trip (e.g., the passenger selected the 'Go' button 438). At block 335, the elevator system executes a first segment of the elevator trip.

At block 340, the mobile device 120 provides guidance to the passenger as to an elevator trip status. Turning to FIG. 4, at a third stage 450, the user interface presents a first segment 454 and a second segment 456. The user interface at the third stage 450 indicates a status to the user that the first elevator B1 (elevator 1 from bank B) is traveling and completing the first segment (e.g., the first segment 454 is enlarged and the second segment 456 is grey). At block 350, the mobile device 120 receives a confirmation of a completion of first segment of the elevator trip.

At block 355, the elevator system executes a second segment of the elevator trip. At block 360, the mobile device 120 provides guidance to the passenger as to the elevator trip status. Turning to FIG. 4, at a fourth stage 470, the user interface presents a first segment 474 and a second segment 476. The user interface indicates a status to the user that the second elevator C2 (elevator 2 from bank C) is traveling and completing the second segment (e.g., the second segment 476 is enlarged and the first segment 474 is grey and reduced in sized).

In accordance with one or more embodiments, a hands-free mechanism provides an ability for any passenger and/or object to get from any source location to any destination location based on a single request. For instance, automatic trains on a segmented track system. Further, a moving pod system for horizontal and/or vertical transportation between destinations.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method executed by a processor of a mobile device, the mobile device being in communication with an elevator system, the computer-implemented method for automatically providing direct real-time travel indications with respect to a multi-segment elevator trip of the elevator system, the computer-implemented method comprising:
   receiving, by the mobile device, a request for the multi-segment elevator trip;
   directly receiving, by the mobile device, feedback signals from the elevator system with respect the multi-segment elevator trip in response to the request; and
   automatically providing, by a user interface of the mobile device, direct real-time travel indications of the multi-segment elevator trip as the mobile device progresses through the elevator system.

2. The computer-implemented method of claim 1, wherein the request is provided to the elevator system by the mobile device to cause the elevator system to determine one or more segments of the multi-segment elevator trip and reply with each corresponding one of the feedback signals as the mobile device progresses through the elevator system.

3. The computer-implemented method of claim 1, wherein the request is utilized by the mobile device to determine the multi-segment elevator trip.

4. The computer-implemented method of claim 1, wherein the request is a user input provided through the user interface of the mobile device.

5. The computer-implemented method of claim 1, wherein the request is an automatic elevator call based on a calendar invite, a mobile device location, or a local time.

6. The computer-implemented method of claim 1, wherein each of the feedback signals corresponds to a completion of a segment of the multi-segment elevator trip.

7. The computer-implemented method of claim 1, wherein each of the feedback signals is provided by the elevator system to the mobile device upon detection of the mobile device at a corresponding checkpoint.

8. The computer-implemented method of claim 1, wherein the direct real-time travel indications of the multi-segment elevator trip comprise graphic representations of the one or more segments of the multi-segment elevator trip, each of the graphic representations presents an elevator assignment as the elevator assignment becomes available to the mobile device.

9. The computer-implemented method of claim 1, wherein the direct real-time travel indications of the multi-segment elevator trip comprise graphic representations of the one or more segments of the multi-segment elevator trip, the graphic representations being proportionally sized with respect to each other based on a length of travel time for a corresponding segment of the multi-segment elevator trip.

10. The computer-implemented method of claim 1, wherein the direct real-time travel indications of the multi-segment elevator trip comprise audio or vibration alerts that signal a completion of a segment of the multi-segment elevator trip.

11. A mobile device comprising a memory and a processor, the mobile device being in communication with an elevator system, the memory storing program instructions for automatically providing direct real-time travel indications with respect to multi-segment elevator trip of an elevator system, the program instructions executable by the processor to cause:
   receiving, by the mobile device, a request for the multi-segment elevator trip;
   directly receiving, by the mobile device, feedback signals from the elevator system with respect the multi-segment elevator trip in response to the request; and
   automatically providing, by a user interface of the mobile device, direct real-time travel indications of the multi-segment elevator trip as the mobile device progresses through the elevator system.

12. The mobile device of claim 11, wherein the request is provided to the elevator system by the mobile device to cause the elevator system to determine one or more segments of the multi-segment elevator trip and reply with each corresponding one of the feedback signals as the mobile device progresses through the elevator system.

13. The mobile device of claim 11, wherein the request is utilized by the mobile device to determine the multi-segment elevator trip.

14. The mobile device of claim 11, wherein the request is a user input provided through the user interface of the mobile device.

15. The mobile device of claim 11, wherein the request is an automatic elevator call based on a calendar invite, a mobile device location, or a local time.

16. The mobile device of claim 11, wherein each of the feedback signals corresponds to a completion of a segment of the multi-segment elevator trip.

17. The mobile device of claim 11, wherein each of the feedback signals is provided by the elevator system to the mobile device upon detection of the mobile device at a corresponding checkpoint.

18. The mobile device of claim 11, wherein the direct real-time travel indications of the multi-segment elevator trip comprise graphic representations of the one or more segments of the multi-segment elevator trip, each of the graphic representations presents an elevator assignment as the elevator assignment becomes available to the mobile device.

19. The mobile device of claim 11, wherein the direct real-time travel indications of the multi-segment elevator trip comprise graphic representations of the one or more segments of the multi-segment elevator trip, the graphic representations being proportionally sized with respect to each other based on a length of travel time for a corresponding segment of the multi-segment elevator trip.

20. The mobile device of claim 11, wherein the direct real-time travel indications of the multi-segment elevator trip comprise audio or vibration alerts that signal a completion of a segment of the multi-segment elevator trip.

* * * * *